C. F. MOCK.

SHEET METAL HAME.

No. 11,627. Reissued Aug. 24, 1897.

Witnesses

Wm. L. Sheidell

Wm. H. Edwards

Inventor

Charles F. Mock.

By Chas. J. Stockman

Attorney

THE NORRIS PETERS CO., PHOTO-LITHO., WASHINGTON, D. C.

UNITED STATES PATENT OFFICE.

CHARLES F. MOCK, OF LOUISVILLE, KENTUCKY.

SHEET-METAL HAME.

SPECIFICATION forming part of Reissued Letters Patent No. 11,627, dated August 24, 1897.

Original No. 531,324, dated December 25, 1894. Application for reissue filed July 30, 1895. Serial No. 557,653.

*To all whom it may concern:*

Be it known that I, CHARLES F. MOCK, a citizen of the United States, residing at Louisville, in the county of Jefferson and State of Kentucky, have invented certain new and useful Improvements in Sheet-Metal Hames; and I do hereby declare the following to be a full, clear, and exact description of the invention, such as will enable others skilled in the art to which it appertains to make and use the same.

The object of my invention is to provide a cheap, light, and strong hame; and it consists in constructing a hame of sheet metal folded lengthwise, so as to form a U-shaped channel, bent into proper shape and provided with the necessary strap-holes, rings, and hook.

I am aware that hames have been made of sheet metal before, and my hame is an improvement on those heretofore made in strength, convenience, and simplicity of construction.

Figure 3:
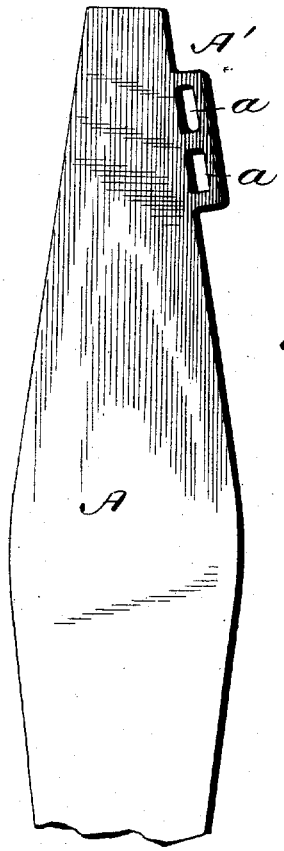
Figure 1:
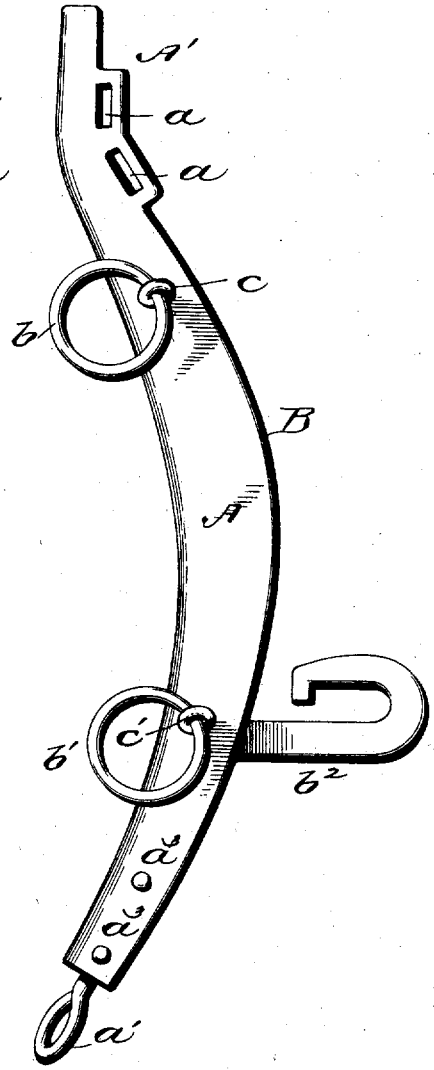
Figure 2:
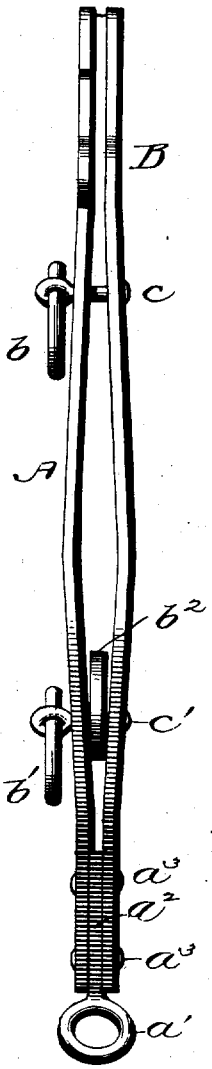
Figure 4:
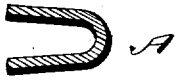

In the drawings, Figure 1 is a side elevation of my hame. Fig. 2 is a top plan view showing my mode of attaching the rings for breast-chain and reins and the loop for the hame-string. Fig. 3 is a plan view of the strip of sheet metal from which the hame is made, showing the projection through which the holes are pierced for the hame-straps; and Fig. 4 is a transverse section of my hame.

Similar letters denote similar parts throughout the several drawings.

B represents the hame.

A represents the metal strip, forming the body of the hame; A′, an integral projection on one side of A, adapted to be pierced with strap-holes *a a*; *a′*, the loop for the hame-string, provided with a shank $a^2$.

$a^3$ $a^3$ are the rivets by which the shank $a^2$ is attached to the body of the hame.

*b* is the rein-ring; *b′*, the breast-strap ring; $b^2$, the tug-hook; *c*, the eyed rivet, by which the rein-ring is attached to the hame, and *c′* the similar rivet, by which the breast-chain ring and tug-hook are attached to the hame.

In constructing my hame I take a strip of sheet metal, as shown in Fig. 3, having an offset or projection on one side, as shown at A′, at a suitable distance from the end designed for the top of hame, adapted to be pierced with holes *a a* for the hame-straps. All the angles of this strip are preferably slightly rounded. The metal strip A is then folded or doubled lengthwise, forming a U-shaped channel, as indicated in Fig. 4, and bent into the proper hame shape. (Shown in Fig. 1.) The shank $a^2$ of the loop *a′* for the hame-string is riveted into the lower end of the channel by rivets $a^3$, passing through both folds of the metal. The rein-ring *b* is attached to the hame by the eyed rivet *c* and the breast-strap ring *b′* by the eyed rivet *c′*. The tug-hook $b^2$ is held in place in the channel between the two sides of the hame by the rivet *c′* also, which passes through a hole in the stem of the hook near its bottom sufficiently large to allow the hook some vertical play.

The folding of the metal forming a channeled frame, as described, strengthens the hame, and the mode of attaching the rings, hook, and hame-string loop *a′* is simple and convenient and tends to strengthen the hame and keep it in shape.

The construction of parts is such that they are easily replaced if broken or needing repair.

It will be observed that the blank A is flat and gradually diminishes in width from an intermediate point toward its ends, the edges converging on similar slanting lines. The sheet is folded longitudinally between its edges and curved outward between its ends to attain the required form to adapt it to the collar, as most clearly shown in Fig. 1, the open side extending outward. By this construction the inner edge of the hame is rounded and does not bear injuriously on the collar, and the inner side being broad obtains an extended bearing upon the outer face of the collar.

It is not essential that the body part A and the projection A′ be formed integral, as said projection may be formed separate from the body and attached thereto by rivets or other suitable fastening means.

It will be observed that before the rein-ring *b* and the backing-ring on the breast-strap *b′* are attached to the body the latter may be employed for either a right or a left hame, which is an important advantage not possessed by hames as heretofore constructed. It will be further observed that the eyed rivets each extend through both folds of the body with their heads in close contact with the outer surface of one fold and their loops in close contact with the outer surface of the other fold, thus serving both to support the rings and to strengthen the body, and also that by supporting the tug-hook on the shank of one of the rivets a proper support therefor is afforded without requiring the provision of an independent device as such support.

Having thus described my invention, what I claim as new, and desire to secure by Letters Patent, is—

1. A hame-body, formed from a sheet-metal blank, bent longitudinally through the center into approximately U shape in cross-section and also bent into proper curvature to form a hame-body, with the base or closed portion of the U forming the inner or bearing edge of the hame, thus condensing or compacting the metal at the place of greatest wear and strain and permitting the body to be formed from a comparatively thin blank, substantially as described.

2. A hame for harness, consisting of a body, formed from a sheet-metal blank, bent longitudinally through the center into approximately U shape in cross-section and also bent into proper curvature to form a hame-body, with the base or closed portion of the U forming the inner or bearing edge of the hame, said body being provided with strap-holes; and rings and hooks supported by the body.

3. A hame for harness, consisting of a body, formed from a flat sheet-metal blank, bent longitudinally into approximately U shape in cross-section and also bent into proper curvature for the hame, with the base or closed portion of the U forming the inner or bearing edge of the hame, thus compacting or condensing the metal at the point of greatest wear and strain; a projection from one side near the top of the body having openings to receive the hame-strap, eyed rivets extending transversely of said body and bracing the folds thereof, rings and a tug-hook supported by said rivets, and a string-loop secured between the folds of the lower end of the body.

4. The combination with a hame-body, formed from a flat sheet-metal blank, whose opposite ends taper similarly from a point between toward its ends, said blank being bent longitudinally through the center into approximately U form in cross-section and also bent into proper curvature for a hame-body, with the base or closed portion of the U forming the inner or bearing edge of the hame, of a projection near the top end of one side thereof, pierced to provide a series of openings to receive the hame-strap, a string-loop having a flattened end fitted and secured between the walls of the lower end of the hame, eyed rivets connecting the folds of the blank, rings fitted in the apertured ends of said rivets, and a tug-hook secured between the folds by one of said rivets.

5. As a new article of manufacture a hame formed from a flat sheet-metal blank, whose opposite edges taper similarly from a point between toward its ends, and having an integral projection at one side near the top end, pierced to provide a series of openings to receive the hame-strap, said blank being folded longitudinally between its edges and curved outward between its ends to adapt it to the collar, the outer edge of the hame being open, a string-loop having a flattened end fitted and secured between the walls of the lower end of the hame, eye-rivets *c c'*, connecting the folds of the blank, rings *b b'* fitted in the apertured ends of the said eye-rivets, and a tug-hook secured between the said folds by the eye-rivet *c'*, substantially as specified.

In testimony whereof I affix my signature in presence of two witnesses.

CHARLES F. MOCK.

Witnesses:
R. T. MOCK,
JNO. B. TELFORD.